United States Patent
Shi et al.

(10) Patent No.: US 11,378,855 B2
(45) Date of Patent: Jul. 5, 2022

(54) TRANSPARENT DISPLAY DEVICE AND METHOD FOR ENHANCING A DISPLAYING EFFECT OF A REAL OBJECT

(71) Applicant: SHENZHEN CHINA STAR OPTOELECTRONICS SEMICONDUCTOR DISPLAY TECHNOLOGY CO., LTD., Shenzhen (CN)

(72) Inventors: Zhiqing Shi, Shenzhen (CN); Galatu Suri, Shenzhen (CN); Lei Wen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 226 days.

(21) Appl. No.: 16/619,774

(22) PCT Filed: Nov. 5, 2019

(86) PCT No.: PCT/CN2019/115511
§ 371 (c)(1),
(2) Date: Dec. 5, 2019

(87) PCT Pub. No.: WO2021/042489
PCT Pub. Date: Mar. 11, 2021

(65) Prior Publication Data
US 2021/0356827 A1 Nov. 18, 2021

(30) Foreign Application Priority Data
Sep. 5, 2019 (CN) .......................... 201910839130.7

(51) Int. Cl.
*G02F 1/1333* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................................................. G02F 1/136286
See application file for complete search history.

(56) References Cited

U.S. PATENT DOCUMENTS

| | | | |
|---|---|---|---|
| 2011/0063542 A1 | 3/2011 | Park et al. | |
| 2014/0184577 A1 | 7/2014 | Kim | |

(Continued)

FOREIGN PATENT DOCUMENTS

| | | | |
|---|---|---|---|
| CN | 102023411 A | 4/2011 | |
| CN | 104767989 A | 7/2015 | |

(Continued)

*Primary Examiner* — Sang V Nguyen
(74) *Attorney, Agent, or Firm* — JMB Davis Ben-David

(57) ABSTRACT

A transparent display device and a method for enhancing a displaying effect of a real object include an array substrate, a color substrate disposed opposite to the array substrate, and a scattering liquid crystal cell located between the array substrate and the color substrate. Pixels structures are disposed on the array substrate. A photosensitive sensor is disposed in the pixel structure, and the photosensitive sensor is configured to control a transmittance of the pixel structure.

4 Claims, 4 Drawing Sheets

(56) References Cited

U.S. PATENT DOCUMENTS

| | | |
|---|---|---|
| 2014/0285750 A1 | 9/2014 | Park |
| 2015/0192827 A1 | 7/2015 | Shestak |
| 2016/0097962 A1 | 4/2016 | Kim |

FOREIGN PATENT DOCUMENTS

| | | | | |
|---|---|---|---|---|
| CN | 104885002 A | | 9/2015 | |
| CN | 105913827 | * | 8/2016 | ............... G09G 3/36 |
| CN | 105913827 A | | 8/2016 | |
| CN | 108681133 A | | 10/2018 | |
| CN | 109491125 | * | 3/2019 | ........... G02F 1/1333 |
| CN | 109491125 A | | 3/2019 | |
| CN | 110196508 A | | 9/2019 | |

* cited by examiner

TRANSPARENT DISPLAY DEVICE AND METHOD FOR ENHANCING A DISPLAYING EFFECT OF A REAL OBJECT

CROSS-REFERENCE TO RELATED APPLICATIONS

This is the U.S. National Stage of International Patent Application No. PCT/CN2019/115511, filed Nov. 5, 2019, which in turn claims the benefit of Chinese Patent Application No. 201910839130.7, filed Sep. 5, 2019.

FIELD OF INVENTION

The present invention relates to a field of display technologies, especially to a transparent display device and a method for enhancing a displaying effect of a real object.

BACKGROUND OF INVENTION

With the rapid development of display technology, display devices with capabilities of transparent display have begun to attract the attention of researchers in recent years. A transparent display device refers to a display device that is capable of providing a transparent display status to allow a viewer to see a scene or an object there-behind through the device, which is usually applied to a vending machine or a showcase that needs to display images before exhibited commodities, and is also applied to a small display device and glass thereof. A transparent display device based on a liquid crystal display device (LCD) mode, because of existence of a polarizer, has a transmittance that is difficult to reach a high level. Therefore, a transparent display device of polymer network liquid crystal (PNLC) or a transparent display device based on the principle of PNLC has been set forth. A PNLC transparent display device, because of removal of the polarizer, has a drastically improved transmittance. However, a new issue has come, because of no polarizer employed, a dark status transmittance thereof is excessively high such that an issue of low contrast exists to further influence the display effect thereof.

As described above, the conventional transparent display device, because of no polarizer employed, has an excessively high dark status transmittance such that an issue of low contrast exists to further influence the display effect thereof.

SUMMARY OF INVENTION

Technical Issue

The conventional transparent display device, because of no polarizer employed, has an excessively high dark status transmittance such that an issue of low contrast exists to further influence the display effect thereof.

Technical Solution

The present invention provides a transparent display device and a method for enhancing a displaying effect of a real object, that are able to effectively improve a display effect of the transparent display device to solve the technical issue that the conventional transparent display device, because of no polarizer employed, has an excessively high dark status transmittance such that an issue of low contrast exists to further influence the display effect thereof.

To solve the above issue, the present invention provides technical solutions as follows.

The present invention provides a transparent display device, comprising an array substrate, a color substrate disposed opposite to the array substrate, and a scattering liquid crystal cell disposed between the array substrate and the color substrate, wherein a plurality of pixels structures are disposed on the array substrate;

wherein a photosensitive sensor is disposed in each of the pixel structures, and the photosensitive sensor is configured to control a transmittance of the pixel structure.

In the transparent display device provided by an embodiment of the present invention, the pixel structure further comprises data lines, scan lines, a thin film transistor, and a pixel electrode disposed in an intersecting region of the data lines and the scan lines, the scan lines are disposed on two opposite ends of the pixel electrode respectively, and the data lines are perpendicular to the scan lines.

In the transparent display device provided by an embodiment of the present invention, one of two opposite ends of the photosensitive sensor is electrically connected to the scan lines, and the other end of the photosensitive sensor is electrically connected to the pixel electrode.

In the transparent display device provided by an embodiment of the present invention, the scattering liquid crystal cell comprises a first transparent plate and a second transparent plate that are disposed parallelly, and a scattering liquid crystal layer is disposed between the first transparent plate and the second transparent plate.

In the transparent display device provided by an embodiment of the present invention, each of the first transparent plate and the second transparent plate is a glass substrate.

In the transparent display device provided by an embodiment of the present invention, material of the scattering liquid crystal layer is polymer network liquid crystal.

The present invention also provides a method for enhancing a displaying effect of a real object by using the transparent display device, the method comprises:

a step S10, providing the transparent display device, and identifying a position of a user's angle of view relative to the transparent display device;

a step S20, switching on a display panel of the transparent display device such that a first pixel region of the transparent display device displays a first scene object behind the transparent display device;

a step S30, by a photosensitive sensor disposed in the display panel, correcting pixel signals in the first pixel region such that the first scene object is connected to a second scene object.

In the transparent display device method for enhancing a displaying effect of a real object provided by an embodiment of the present invention, in the step S10, the position of the user's angle of view relative to the transparent display device is a best viewing position.

In the transparent display device method for enhancing a displaying effect of a real object provided by an embodiment of the present invention, in the step S30, the second scene object is clearer than the first scene object.

In the transparent display device method for enhancing a displaying effect of a real object provided by an embodiment of the present invention, the step S30 further comprises:

a step S301, by the photosensitive sensor disposed in the display panel, sensing a light intensity through each of a plurality of pixels in the first pixel region; and a step S302, controlling the photosensitive sensor to act on the pixel with a comparatively low light intensity being such that a voltage applied to the pixel with the comparatively low light intensity is increased to correct the first scene object into the second scene object.

Advantages

Advantages of the present invention are as follows. The transparent display device and the method for enhancing a displaying effect of a real object provided by the present invention dispose the photosensitive sensor in the pixel structure of the transparent display device, control a transmittance of specific ones of the pixels to make an object behind thereof clearer, which further enhances a display effect of transparent display device to a real object.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
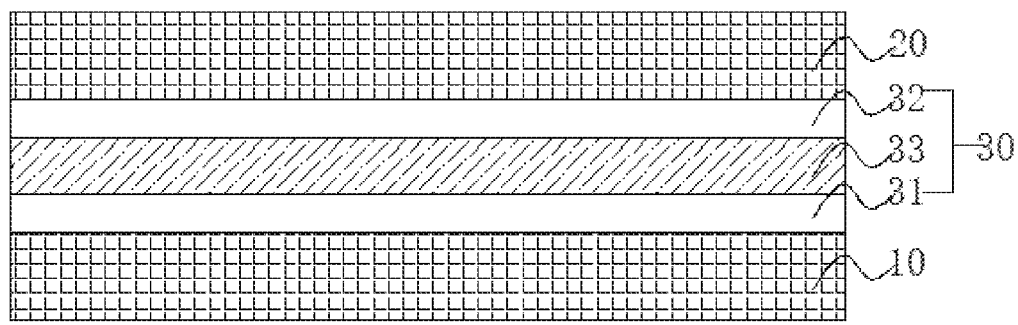
FIG. 1 is a schematic structural view of a transparent display device of the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue that the conventional transparent display device, because of no polarizer employed, has an excessively high dark status transmittance such that an issue of low contrast exists to further influence the display effect thereof. The present invention can solve the defect.

With reference to FIG. 1, FIG. 1 is a schematic structural view of a transparent display device of the present invention. The transparent display device comprises an array substrate 10, a color substrate 20 disposed opposite to the array substrate 10, and a scattering liquid crystal cell 30 located between the array substrate 10 and the color substrate 20.

Preferably, each of the array substrate 10 and the color substrate 20 is a transparent glass substrate.

Specifically, the scattering liquid crystal cell 30 refers to a liquid crystal cell filled with scattering liquid crystal. The scattering liquid crystal cell 30 is a liquid crystal cell (Open Cell) assembled by two substrates hermetically sandwiching liquid crystal. The scattering liquid crystal cell 30 is encapsulated between the array substrate 10 and the color substrate 20 by frame sealant.

Specifically, the scattering liquid crystal cell 30 has a scattering liquid crystal layer 33, and the scattering liquid crystal layer 33 is sandwiched between the first transparent plate 31 and the second transparent plate 32. Preferably, material of the scattering liquid crystal layer 33 is polymer network liquid crystal (PNLC). A thickness of the scattering liquid crystal layer 33 varies depending on characteristics of different materials of the liquid crystal. The thinner the scattering liquid crystal layer is, the better a transmissive characteristic thereof is, and however the lower a contrast thereof is. The thicker the scattering liquid crystal layer is, the worse the transmissive characteristic thereof is, and however the higher the contrast thereof is. Therefore, a thickness range of the scattering liquid crystal layer is from 4 microns to 50 microns to coordinate the transmittance and the contrast of the light transmissive display device such that the light transmissive display device improves the contrast whilst identifying the transmittance.

Figure 2:
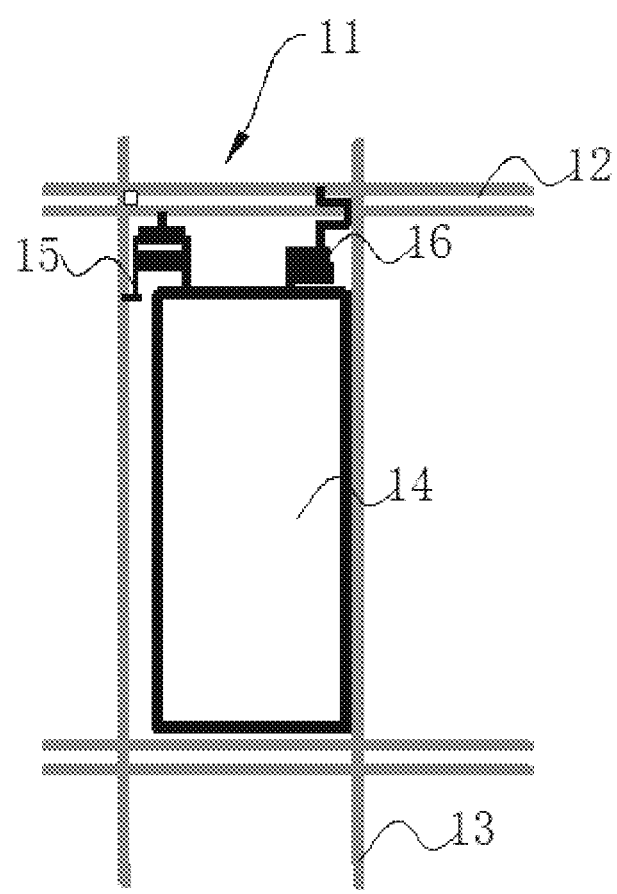
FIG. 2 is a schematic view of a design of a pixel of the transparent display device of the present invention.

With reference to FIG. 2, FIG. 2 is a schematic view of a design of a pixel of the transparent display device of the present invention. A plurality of pixels structures 11 are disposed on the array substrate 10 on the transparent display device. The pixel structure 11 also comprises data lines 13, scan lines 12, a thin film transistor 15, and a pixel electrode 14 disposed in an intersecting region of the data lines 13 and the scan lines 12. The scan lines 12 are disposed respectively on two opposite ends of the pixel electrode 14. The data lines 13 are perpendicular to the scan lines 12.

Specifically, the thin film transistor 15 is formed on an intersection portion of the scan lines 12 and the data lines 13, and is connected to the pixel electrode 14.

Specifically, a photosensitive sensor 16 is disposed in the pixel structure 11. The photosensitive sensor 16 is configured to control a transmittance of the pixel structure 11. Preferably, one of two opposite ends of the photosensitive sensor 16 is electrically connected to the scan lines 12, and the other end of the photosensitive sensor 16 is electrically connected to the pixel electrode 14. Because the pixel electrode 14 is electrically connected to the thin film transistor 15 and the photosensitive sensor 16, the pixel electrode 14 is affected commonly by the thin film transistor 15 and the photosensitive sensor 16.

Figure 3:
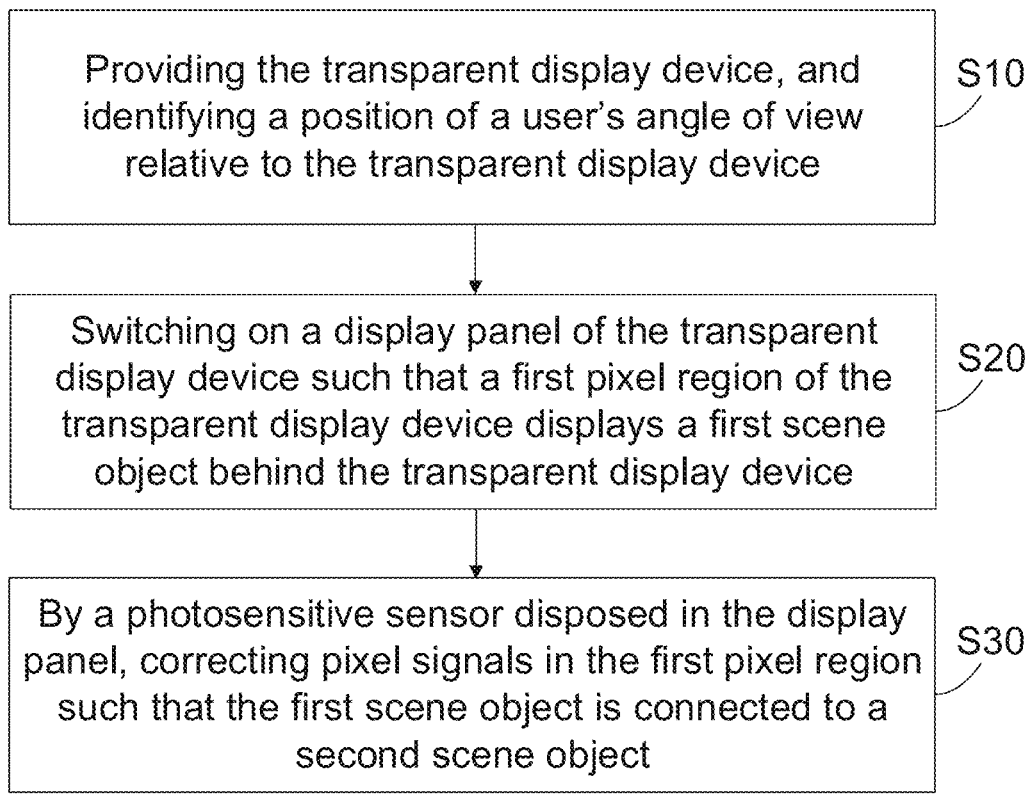
FIG. 3 is a flowchart of method for enhancing a displaying effect of a real object by using the above transparent display device of the present invention.

With reference to FIG. 3, FIG. 3 is a flowchart of method for enhancing a displaying effect of a real object by using the above transparent display device of the present invention. The method comprises steps as follows.

A step S10 provides the transparent display device, and ensures a position of a user's angle of view relative to the transparent display device.

Specifically, the step S10 further comprises steps as follows.

First, a transparent display device is provided, the transparent display device is a polymer network liquid crystal transparent display device, and a photosensitive sensor is disposed in the pixel structure in the transparent display device. Then, a position of the user's angle of view relative to the transparent display device is identified. The user's angle of view is an observing point of the user observing an object in a scene behind the transparent display device.

Preferably, the position of the user's angle of view relative to the transparent display device is a best viewing position.

A step S20 switches on a display panel of the transparent display device such that a first pixel region of the transparent display device displays a first scene object behind the transparent display device.

Specifically, the step S20 further comprises steps as follows.

The display panel of the transparent display device is switched on, and the first pixel region of the transparent display device displays the first scene object behind the transparent display device. The object herein can include various creatures and non-creatures in a real life. Preferably, the object can include humans, animals, transportations, buildings, daily necessities, and natural plants.

A step S30, by a photosensitive sensor disposed in the display panel, corrects pixel signals in the first pixel region such that the first scene object is connected to a second scene object.

Specifically, the step S30 further comprises steps as follows.

First, a light intensity through each of a plurality of pixels in the first pixel region is sensed by the photosensitive sensor disposed in the display panel. Then, the photosensitive sensor is controlled to act on the pixel with a comparatively low light intensity being such that a voltage applied to the pixel with the comparatively low light intensity is increased to correct the first scene object into the second scene object. The second scene object is clearer than the first scene object.

Specifically, a working principle of the photosensitive sensor acting on the transparent display device is as follows.

After the transparent display device is switched on, reflective light of the object behind enters human eyes through the display panel of the transparent display device. Because reflective lights of different objects has different wavelengths and strengths, the photosensitive sensor can compare a light intensity of a pixel to that of one or more adjacent pixels to identify the light intensity through the pixel. If the light intensity is comparatively low, it indicates that the object behind is a real object needing to be observed. Then, the photosensitive sensor will reactively control and increase the voltage applied to the pixel to raise the light transmittance of the pixel. Therefore, a display effect of the transparent display device is improved.

Figure 4:
FIG. 4 is a schematic view of a display effect of the transparent display device of the present invention.

With reference to FIG. 4, FIG. 4 is a schematic view of a display effect of the transparent display device of the present invention. Pixel signals in a pixel region of the transparent display device corresponding to of a logo of "China Star Optoelectronics Technology", after corrected by the photosensitive sensor, has an increased transmittance to make the logo of "China Star Optoelectronics Technology" clearer.

Advantages of the present invention are as follows. The transparent display device and the method for enhancing a displaying effect of a real object provided by the present invention dispose the photosensitive sensor in the pixel structure of the transparent display device, control a transmittance of specific ones of the pixels to make an object behind thereof clearer, which further enhances a display effect of transparent display device to a real object.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A transparent display device, comprising an array substrate, a color substrate disposed opposite to the array substrate, and a scattering liquid crystal cell disposed between the array substrate and the color substrate, wherein a plurality of pixel structures are disposed on the array substrate;
   wherein a photosensitive sensor is disposed in each of the pixel structures, and the photosensitive sensor is configured to control a transmittance of the pixel structure;
   wherein the photosensitive sensor is configured to compare a light intensity of first one of the pixel structures to a light intensity of a second one or more of the pixel structures adjacent to the first one to identify the light intensity through the first one pixel structure, and to increase a voltage applied to the first one of the pixel structures to raise the transmittance of the first one of the pixel structures when the light intensity of the first one of the pixel structures is comparatively low;
   wherein the pixel structure further comprises data lines, scan lines, a thin film transistor, and a pixel electrode disposed in an intersecting region of the data lines and the scan lines, the scan lines are disposed on two opposite ends of the pixel electrode respectively, and the data lines are perpendicular to the scan lines;
   wherein one of two opposite ends of the photosensitive sensor is directly and electrically connected to the scan line, and the other end of the photosensitive sensor is directly and electrically connected to the pixel electrode.

2. The transparent display device as claimed in claim 1, wherein the scattering liquid crystal cell comprises a first transparent plate and a second transparent plate that are disposed parallelly, and a scattering liquid crystal layer is disposed between the first transparent plate and the second transparent plate.

3. The transparent display device as claimed in claim 2, wherein each of the first transparent plate and the second transparent plate is a glass substrate.

4. The transparent display device as claimed in claim 2, wherein material of the scattering liquid crystal layer is polymer network liquid crystal.

\* \* \* \* \*